Patented Sept. 5, 1944

2,357,317

UNITED STATES PATENT OFFICE 2,357,317

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application September 23, 1941, Serial No. 411,975

6 Claims. (Cl. 260—205)

This invention relates to new azo compounds and their application to the art of dyeing or coloring. Textile materials such as organic derivatives of cellulose, wool, silk, "nylon" and "Vinyon" and lacquers composed of cellulose esters, cellulose ethers and vinyl derivatives, for example, can be colored. Coloration can be effected by dyeing, printing, stencilling, or other suitable methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While my invention will be illustrated more particularly in connection with the coloration of cellulose acetate, a material to which the invention is especially adapted, it will be understood that it applies equally to the coloration of the other materials just mentioned.

It is an object of my invention to provide a new class of azo compounds. Another object is to provide a process for the dyeing or coloration of various textile materials including organic derivatives of cellulose, wool, silk, "nylon" and "Vinyon" textile materials. A further object is to provide dyed textile materials which are of good fastness to light and washing. Other objects will appear hereinafter.

The azo compounds of my invention, by means of which the above objects are accomplished or made possible, consist of the azo compounds selected from the group consisting of azo compounds having the formulas:

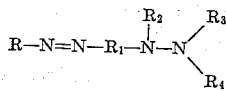

and R—N=N—X, wherein R stands for a member selected from the group consisting of a benzene nucleus, an azobenzene nucleus and a naphthalene nucleus, $R_1$ stands for a member selected from the group consisting of a benzene nucleus and a naphthalene nucleus, $R_2$ stands for a member selected from the group consisting of hydrogen, an alkyl group and a phenyl group, $R_3$ and $R_4$ each represents a member selected from the group consisting of hydrogen, an acyl group, an alkyl group and a phenyl group, and wherein at least one of the members $R_2$, $R_3$ and $R_4$ is other than hydrogen, X represents a member selected from the group consisting of a 1,2,3,4-tetrahydroquinoline nucleus and a phenmorpholine nucleus, each of said nuclei being joined through the carbon atom in their 6-positions to the azo bond shown, and wherein each of said 1,2,3,4-tetrahydroquinoline and phenmorpholine nuclei contains a

group, wherein $R_3$ and $R_4$ have the meaning above given, attached to the nitrogen atom forming a part of their nuclei.

Ordinarily R and $R_1$ are benzene nuclei. Similarly, $R_2$ is usually an alkyl group while one of $R_3$ and $R_4$ is normally an alkyl group and the other is hydrogen or an alkyl group. Advantageously, when the dye compounds of my invention are used to color organic derivatives of cellulose, R and $R_1$ are benzene nuclei.

Depending upon the particular components employed to prepare the dyes orange, blue, violet, reddish-blue, red and rubine shades, for example, can be obtained. When coloring organic derivatives of cellulose nuclear non-sulfonated dyes, which are preferably free of a nuclear carboxylic acid group in either its free acid or salt form, should be employed. These compounds can also be employed to color the other materials named herein. The nuclear sulfonated compounds possess little or no applicability for the coloration of organic derivatives of cellulose but can be employed for the coloration of wool and silk by known methods for the coloration of these materials. Dyes containing a free carboxylic acid group can be used to color wool and silk. The nuclear sulfonated compounds can be prepared by sulfonation of the unsulfonated compounds by employing known sulfonation methods.

The azo compounds of my invention can be prepared by coupling diazotized aminobenzene, aminoazobenzene and aminonaphthalene compounds with the hydrazine coupling components indicated hereinbefore.

The following examples illustrate the preparation of the azo compounds of my invention:

Example 1

1 gram mole of p-aminoacetophenone is diazotized in known fashion and the diazonium compound obtained is added to a cold aqueous hydrochloric acid solution of 1 gram mole of phenyl- N-methyl-N'-dimethylhydrazine having the formula:

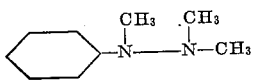

The coupling reaction which takes place is completed by adding sodium carbonate to the reaction mixture until it no longer turns Congo red paper blue. The dye compound formed is recovered by filtration, washed with water and dried. The dye compound obtained colors the textile materials named herein orange.

Example 2

1 gram mole of 1-amino-2-chloro-4-nitrobenzene is diazotized and the diazonium compound obtained is coupled with 1 gram mole of phenyl-N-β-hydroxyethyl-N'-di-β-hydroxyethyl-hydrazine. Coupling and recovery of the dye compound formed can be carried out in accordance with the procedure described in Example 1. The dye compound obtained colors cellulose acetate silk and the other textile materials named herein red.

Example 3

1 gram mole of p-nitroaniline is diazotized and the diazonium compound obtained is coupled with 1 gram mole of 3-methylphenyl-N-methyl-N'-di-β-hydroxyethylhydrazine having the formula:

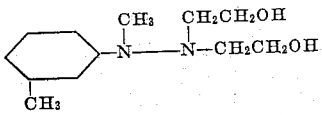

The dye compound obtained yields red shades on the textile materials named herein.

Example 4

1 gram mole of 1-amino-2-hydroxy-4-nitrobenzene is diazotized and the diazonium compound obtained is coupled with 1 gram mole of 3-methyl-6-methoxyphenyl-N-sodium-β-sulfonic-ethyl-N'-ethylmethylhydrazine. The dye compound obtained yields pinkish-rubine shades.

Example 5

1 gram mole of diazotized 2,4-dinitroaniline is added to an acetic acid solution of 1 gram mole of 2-ethoxy-5-acetaminophenyl-N-methyl-N'-aceto-β-hydroxyethylhydrazine. Coupling and recovery of the dye compound formed can be carried out in accordance with the general procedure described in Example 1. The dye compound obtained yields blue shades.

Example 6

1 gram mole of diazotized 1-amino-2,4-dinitro-6-chlorobenzene is coupled in a hydrochloric or acetic acid solution with 1 gram mole of 1-di-β-hydroxyethylamino-7-methyl-tetrahydroquinoline having the formula:

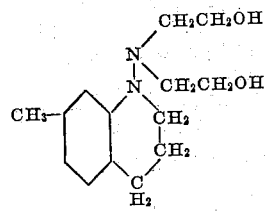

The dye compound obtained colors cellulose acetate silk and the other textile materials named reddish-blue.

Example 7

1 gram mole of diazotized 1-amino-2,4-dinitro-6-bromobenzene is coupled in a hydrochloric acid or acetic acid solution with 1 gram mole of 1-[methyl,β,γ-dihydroxypropyl]-amino-7-methyl-phenmorpholine having the formula:

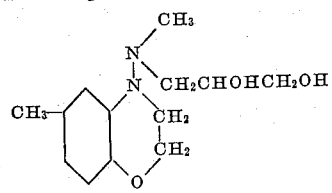

The dye compound obtained yields reddish-blue shades.

Example 8

1 gram mole of diazotized 2-amino-3,5-dinitrobenzene-sulfonethylamide is coupled in an acid solution with 1 gram mole of

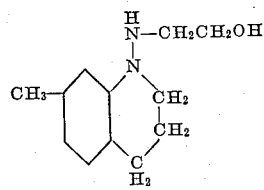

The dye compound obtained colors cellulose acetate silk and the other textile materials named blue.

Example 9

1 gram mole of diazotized 2-amino-5-nitrophenylmethylsulfone is coupled with 0.5 gram mole of 3-methoxyphenyl-N-β-hydroxyethyl-N'-β-hydoxyethyl, 3'-methoxyphenyl hydrazine having the formula:

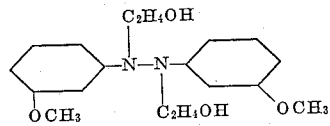

The dye compound obtained yields rubine shades.

Example 10

1 gram mole of diazotized 1-amino-2-bromo-4-nitrobenzene is coupled in a hydrochloric or acetic acid solution with 1 gram mole of 5-hydroxynaphthalene-N-methyl-N'-di-β-methoxyethyl hydrazine having the formula:

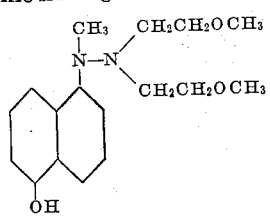

The dye compound obtained yields blue shades.

Example 11

1 gram mole of

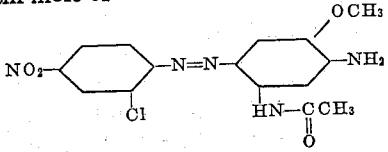

is diazotized and the diazonium compound obtained is coupled in an acid solution with 1 gram mole of the coupling component shown in Example 3. The dye compound obtained yields rubine shades.

It will be understood that dyes, as that from which the diazonium compound of the example is obtained, containing a free diazotizable amino group can be directly applied to the fiber, diazotized thereon and coupled with a coupling component of the invention to obtain developed dyeings with dye compounds of the invention.

Example 12

1 gram mole of diazotized p-aminoazobenzene is coupled in water with 1 gram mole of 5-hydroxy-8-sodium sulfonic naphthalene-N-phenyl-N'-dimethyl hydrazine. The dye compound obtained colors silk and wool blue from an aqueous solution of the dye which may contain a salt such as sodium chloride.

Example 13

1 gram mole of diazotized 5-nitro-2-aminobenzenesulfonic acid is coupled in a hydrochloric acid solution with 1 gram mole of 2-methoxyphenyl-N-butyl-N'-dibutylhydrazine. The dye compound obtained colors silk and wool red shades.

Example 14

1 gram mole of diazotized 5-nitro-2-aminobenzoic acid is coupled in water with 1 gram mole of 5,7-disodiumsulfonic naphthalene-N-sodium - $\beta$- sulfoethyl-N'-diethyl hydrazine. The dye compound obtained colors wool and silk violet shades.

Example 15

1 gram mole of diazotized 2,4-dinitroaniline is coupled with 1 gram mole of 3-sodium sulfonicphenyl-N-cetyl-N'-hydrogen, 4'-sulfonicbenzenehydrazine. The dye compound obtained colors wool and silk violet shades.

Example 16

1 gram mole of diazotized 1-amino-2-carboxyl-4,6-di-nitrobenzene is coupled with 1 gram mole of 3-acetamino-6-ethoxyphenyl-N-methyl - N'- dimethylhydrazine. The dye compound obtained colors silk and wool blue.

Example 17

1 gram mole of diazotized 1-amino-5-hydroxy-8-sulfonic naphthalene is coupled with 1 gram mole of 3-methyl-6-methoxyphenyl-N - $\beta$ - hydroxyethyl - N' - di - $\beta$ - hydroxyethylhydrazine. The dye compound obtained colors silk and wool violet shades.

Example 18

1 gram mole of diazotized 5-nitro-2-aminophenylmethylsulfone is poured onto ice and the mixture resulting is then added to an acetic acid solution of 1 gram mole of 5-hydroxynaphthalene-N-hydrogen - N' - hydrogen-$\beta,\gamma$-dihydroxypropylhydrazine. The coupling reaction which takes place is completed by adding sodium acetate until the mixture no longer turns Congo red paper blue. The dye compound formed is recovered by filtration, washed with water and dried. It colors cellulose acetate, "nylon," wool, and silk greenish-blue shades. Textile fabrics of cellulose acetate silk dyed with this dye are easily dischargeable to a pure white.

An equal gram molecular weight of 2-amino-5-nitrobenzenesulfone-$\omega$-methylcarboxyamide, 2-amino-5-nitrobenzene - $\beta$ - hydroxyethylsulfonamide, 2-amino- 5 -nitrobenzene-di-$\beta$-hydroxyethylsulfonamide and 2-amino-5-nitrobenzenesulfonethylamide can be substituted for the 5-nitro-2-aminophenylmethylsulfone of the above example to obtain dye compounds which color the materials above named and which yield shades on cellulose acetate silk which are dischargeable to a pure white.

Example 19

1 gram mole of diazotized p-nitroaniline is coupled with 1 gram mole of

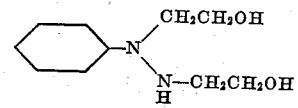

The dye compound obtained colors the materials named herein scarlet.

Example 20

1 gram mole of of diazotized p-nitroaniline is coupled with 1 gram mole of

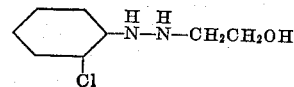

The dye compound obtained yields orange shades on the materials named herein.

Example 21

1 gram mole of diazotized 1-amino-2,4-dinitro-6-sulfonethylamide is coupled with 1 gram mole of

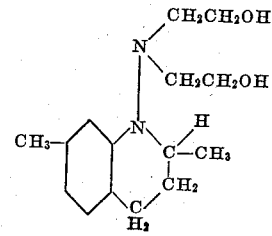

The dye compound obtained yields blue shades on the materials named herein.

It will be understood that the foregoing examples are intended to be illustrative and not limitative of the compounds of my invention. Thus, any of the diazonium compounds disclosed herein can be coupled with any of the hydrazine coupling components disclosed herein to obtain dye compounds of the invention. Further, it will be obvious that many other diazonium compounds and hydrazine coupling components other than those specifically disclosed can be employed. Additional aminobenzene and aminonaphthalene compounds which can be used to prepare suitable diazonium compounds are shown, for example, in McNally and Dickey Patent No. 2,211,339, issued August 13, 1940, and McNally and Dickey Patent No. 2,227,977, issued January 7, 1941. Additional hydrazine coupling components which can be used include

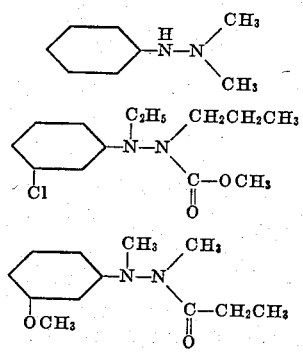

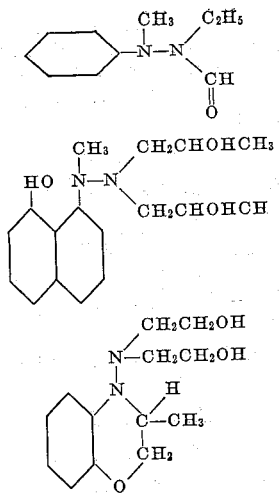

and

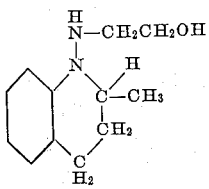

The hydrazine coupling components employed in the manufacture of the azo compounds disclosed herein can be prepared in accordance with the procedure described hereinafter.

Compounds having the formula

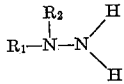

can be prepared by reacting compounds having the formula

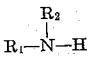

with nitrous acid and reducing the nitroso compounds thus formed with zinc and acetic acid. $R_1$ and $R_2$ in the above formulas have the meaning previously assigned to them.

1,2,3,4-tetrahydroquinoline and phenmorpholine compounds containing an amino grouping joined to their nuclear nitrogen atom can be prepared by reacting 1,2,3,4-tetrahydroquinoline and phenmorpholine compounds unsubstituted in their nuclear nitrogen atom with nitrous acid and reducing the nitroso compounds thus formed with zinc and acetic acid.

Acyl, alkyl and phenyl groups can be introduced into the hydrazine compounds obtained as just described by methods well known to the art for the introduction of such groups. Thus, acyl groups can be introduced by treatment with acetic anhydride, propionic anhydride, ethyl chlorocarbonate, nitrourea, acetyl chloride and a potassium cyanate and hydrochloric acid mixture, for example. Hydroxyalkyl groups can be introduced by treatment with ethylene oxide, propylene oxide, trimethylene oxide, ethylene chlorhydrin or glyceryl chlorhydrin, and alkyl groups can be introduced by treatment with methyl iodide, methyl sulfate and ethyl sulfate, for example, while phenyl groups can be introduced by treatment with a chlorinated benzene compound such as chlorobenzene, para-nitrochlorobenzene and meta methoxychlorobenzene, for example.

It is here noted that the term "nylon" refers to a linear polyamide resin which is believed to be basically described or claimed in U. S. Letters Patent 2,071,250, issued February 16, 1937, to Wallace H. Carothers. The term "Vinyon" refers to a vinyl chloride-vinyl acetate copolymer. This material is more completely identified at pages 73 and 74 of "Synthetic Organic Chemicals," 10th edition, published October 15, 1940, by Carbide & Carbon Chemicals Corporation.

The nuclear non-sulfonated azo compounds of my invention are, for the most part, relatively insoluble in water. They can be advantageously directly applied to the textile materials named herein in the form of an aqueous suspension which can be prepared by grinding the dye to a paste in the presence of a sulfonated oil, soap or other suitable dispersing agent and dispersing the resulting paste in water.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents, together with the amounts that may be employed, are disclosed in McNally and Dickey Patent No. 2,115,030, issued April 26, 1938. The process disclosed in this patent for the dyeing of cellulose acetate silk can be used in applying the nuclear non-sulfonated dyes of the present application to this material specifically as well as the other textile materials named herein.

The nuclear sulfonated dye compounds can be applied for the dyeing of wool and silk by methods known in the art for the dyeing of these materials. They can, for example, be applied directly to wool and silk by the method disclosed for the coloration of cellulose acetate silk, except that in many cases the dye will be sufficiently soluble as to render the use of a dispersing agent unnecessary. It is here noted that, while colors yielded by the nuclear non-sulfonated dye compounds have been given primarily with reference to cellulose acetate silk, the other materials named herein are colored generally similar shades.

I claim:
1. The azo compound having the formula:

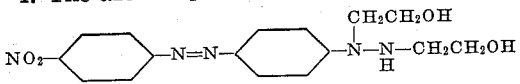

2. The azo compound having the formula:

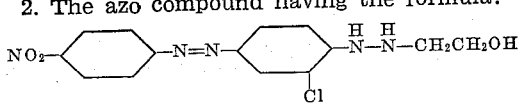

3. The azo compounds having the general formula:

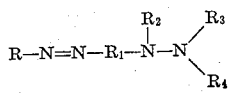

wherein R stands for a member selected from the group consisting of a benzene nucleus, an azobenzene nucleus and a naphthalene nucleus, $R_1$ stands for a member selected from the group consisting of a benzene nucleus and a naphthalene nucleus, $R_2$, $R_3$ and $R_4$ each represents a member selected from the group consisting of hydrogen, alkyl groups and hydroxyalkyl groups, at least one of the groups $R_2$, $R_3$ and $R_4$ being a member of the group consisting of alkyl and hydroxyalkyl groups.

4. Textile materials colored with an azo dye compound selected from those having the following general formula:

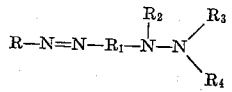

wherein R stands for a member selected from the group consisting of a benzene nucleus, an azobenzene nucleus and a naphthalene nucleus, $R_1$ stands for a member selected from the group consisting of a benzene nucleus and a naphthalene nucleus, $R_2$, $R_3$ and $R_4$ each represent a member selected from the group consisting of hydrogen, alkyl groups and hydroxyalkyl groups, at least one of the groups $R_2$, $R_3$ and $R_4$ being a member of the group consisting of alkyl and hydroxyalkyl groups.

5. A cellulose acetate colored with a nuclear non-sulfonated azo dye compound selected from those having the following general formula:

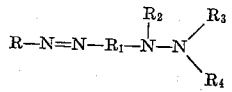

wherein R stands for a member selected from the group consisting of a benzene nucleus, an azobenzene nucleus and a naphthalene nucleus, $R_1$ stands for a member selected from the group consisting of a benzene nucleus and a naphthalene nucleus, $R_2$, $R_3$ and $R_4$ each represents a member selected from the group consisting of hydrogen, alkyl groups and hydroxyalkyl groups, at least one of the groups $R_2$, $R_3$ and $R_4$ being a member of the group consisting of alkyl and hydroxyalkyl groups.

6. The azo compound having the formula:

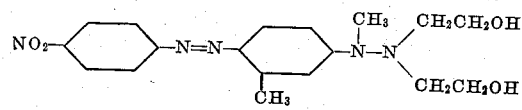

JOSEPH B. DICKEY.

CERTIFICATE OF CORRECTION.

Patent No. 2,357,317. September 5, 1944.

JOSEPH B. DICKEY.

It is hereby certified that error appears in the printed specification of the above numbered patent requiring correction as follows: Page 4, first column, line 9, for that portion of the formula reading "$CH_2CHOHCH$" read --$CH_2CHOHCH_3$--; and that the said Letters Patent should be read with this correction therein that the same may conform to the record of the case in the Patent Office.

Signed and sealed this 28th day of November, A. D. 1944.

Leslie Frazer (Seal) Acting Commissioner of Patents.